US 6,614,948 B2

United States Patent
Jacobowitz et al.

(10) Patent No.: US 6,614,948 B2
(45) Date of Patent: Sep. 2, 2003

(54) ELECTRICALLY SWITCHABLE OPTICAL ELEMENTS USING WAVELENGTH LOCKED FEEDBACK LOOPS

(75) Inventors: Lawrence Jacobowitz, Wappingers Falls, NY (US); Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 09/943,672

(22) Filed: Aug. 31, 2001

(65) Prior Publication Data

US 2003/0044101 A1 Mar. 6, 2003

(51) Int. Cl.[7] .................................. G02B 6/26
(52) U.S. Cl. .................. 385/10; 385/8; 385/9; 385/16; 385/17; 385/18
(58) Field of Search .............. 385/10, 2, 8, 9, 385/16–24, 31; 455/126, 127; 365/194, 233; 250/214 A, 214 AG, 214 R, 206

(56) References Cited

U.S. PATENT DOCUMENTS 5,202,553 A * 4/1993 Geller .................. 250/214 A
5,933,767 A * 8/1999 Leizerovich et al. ........ 455/126
5,937,115 A * 8/1999 Domash ...................... 385/16
6,314,010 B1 * 11/2001 Markow et al. ............. 363/97
6,426,900 B1 * 7/2002 Maruyama et al. .......... 365/194

OTHER PUBLICATIONS

"Introduction to DWDM Technology Data in a Rainbow", by Stamatios V. Kartalopoulos, Lucent Technologies, Inc., IEEE communications Society, Sponsor, SPIE Optical Engineering Press, pp. 67–68.
"Introduction to DWDM Technology Data in a Rainbow", by Stamatios V. Kartalopoulos, Chapter 9, pp. 131–136.
"Distributed feedback semiconductor lasers", by John Carroll, et al., IEE Circuits, Devices and Systems Series 10, SPIE Press Monograph vol. PM52, 1998, pp. 7–15.
"Micromachining System Accommodates Large Wafers" Robert Bann et al., Laser Focus World, Jan. 2001, vol. 27 No. 1, pp. 189, 190 and 192.

* cited by examiner

Primary Examiner—Mohammad Sikder
(74) Attorney, Agent, or Firm—Scully, Scott, Murphy & Presser; Tiffany Townsend, Esq.

(57) ABSTRACT

Electrically switchable optical elements, such as application specific integrated elements including filters, lenses and switches, are combined with wavelength locked feedback loops. Electrically Switchable Bragg Grating (ESBG) technology is combined with a wavelength locked feedback loop to provide variable focal length optical systems which automatically adjust the focal length of incident light.

20 Claims, 6 Drawing Sheets

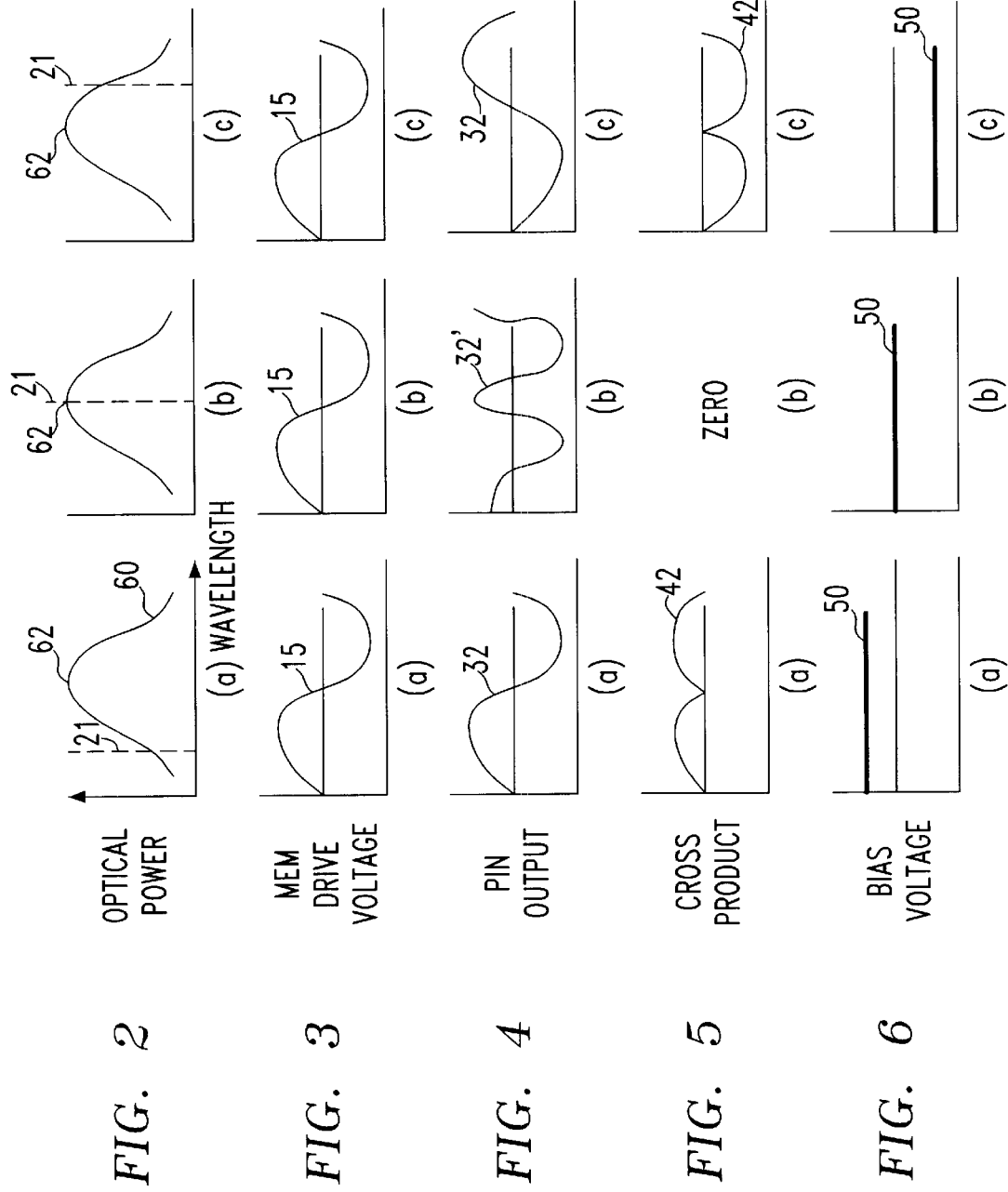

ELECTRICALLY SWITCHABLE OPTICAL ELEMENTS USING WAVELENGTH LOCKED FEEDBACK LOOPS

BACKGROUND OF THE INVENTION

1. Field of the Invention

The present invention relates generally to electrically switchable optical elements, such as application specific integrated elements including filters, lenses and switches, using wavelength locked feedback loops, and more particularly pertains to a combination of Electrically Switchable Bragg Grating (ESBG) technology with a wavelength locked feedback loop to provide variable focal length optical systems which automatically adjust the focal length of incident light.

2. Discussion of the Prior Art

Electrically Switchable Bragg Grating (ESBG—pronounced "S-Bug") technology has recently become available from companies such as DigiLens Inc. These optical components possess electrically switchable diffractive optical elements or waveguides in a single solid-state device. The resulting device is capable of providing a unique blend of complex optical functionality within a tiny integrated package. The availability of this technology has opened up many new potential applications.

The ESBG technology has been presented in three basic variations of Application Specific Integrated (ASI) technology, namely Application Specific Integrated Filters (ASIF), Lenses (ASIL) and Switches (ASIS). The ASIL is discussed as a specific example below, with the understanding that other forms of ESBG technology can be substituted and used with dither wavelength locked feedback loops pursuant to the present invention.

An ASIL has different computer holograms imaged onto each layer. Each hologram corresponds to a different diffraction grating. For example, a diffractive lens with a variable focal length is capable of switching light at 35 $\mu$sec, 10× faster than electrical switching, and provides wavelength insensitive focusing in a compact package. A key element of this technology is a holographic, polymer-dispersed liquid crystal. While it contains materials common to liquid crystals used in flat-panel displays, the way in which the actual material builds the optical elements is different. A monomer and polymer liquid crystal are combined in such a way that upon exposure to a laser light fringe pattern, an area of pure polymer is created in the light fringes, and a mixture of monomer and polymer liquid crystal remains in the dark fringes. This plane of differing refractive indices is called a phase volume hologram. In the dark fringes, the liquid crystal is embedded in very small microdroplets.

When an AC voltage is applied across the plate, the microdroplets' optical axes oscillate to match the refractive index of the monomer/liquid crystal area with that of the pure polymer. Thus the entire field looks like a clear window. With no voltage applied, the plane is a hologram containing a number of optical elements, essentially a diffractive lens. The result is the ability to switch the optical elements in and out of a "diffractive lens," independent of wavelength.

These hologram layers, typically 5 to 30 $\mu$m thick, are deposited on a glass or plastic substrate. They can be stacked so that red, green and blue hologram optical elements can be contained in three separate layers with switching at 35 microseconds occurring within each layer. In this manner, the resultant optical switch can replace large refractive components, magnifying up to a factor of 20 to 40× and providing full-color capabilities. Ultimately switching speeds may become as fast as 10 microseconds or less.

Instead of transmitting only a very narrow band of wavelengths, ASIL allows diffraction gratings that transmit red, blue or green light to be layered on top of each other. These layers can be switched on and off in turn at frequencies greater than 85 hertz, giving the full spectrum of color with no apparent flicker. Any optical effect that can be produced with conventional lenses can be written onto ASILs. ASIL devices are typically mounted on glass or plastic thin film substrates about 0.2 mms thick; the resulting devices are very lightweight and thus suitable for near-eye and handheld applications such as cell phone displays and mobile computing. As another example, combined with other technologies, ASILs can be used for high definition television (HDTV) projections.

There are many possible applications for this technology, including an electro/optical wavelength filter for wavelength multiplexing combined with a dynamic optical add/drop multiplexer. This area enables a new generation of optical switch components, including for example a multi-channel Dynamic Spectral Equalizer (DSE), which allows a real-time adjustment of power distribution within a wavelength multiplexing system. This ensures spectral flatness across all wavelength channels, which would otherwise be distorted by the highly non-uniform and dynamically varying gain profiles induced by cascaded erbium doped optical amplifiers (EDFA's) and active Add/Drop functionality within the optical network. The resulting DSE is polarization-insensitive, eliminates the need for a multiplexing or demultiplexing layer within the network, and can potentially exhibit switching speeds as fast as 50 microseconds in either a free space or a guided wave optical design.

In telecommunications, all optical interconnects are currently converted to electricity where switching functions are performed and then converted back into light for transmission through the fiber. Optical switches can maintain transmission speed through high-bandwidth, fiber-based systems. With this technology, in addition to providing the ability to switch light and handle very complex routing systems, an asynchronous digital subscriber loop (ADSL) can switch between different frequencies of light. For example, in wavelength division multiplexing, the ADSL can selectively switch any particular frequency by effectively adding filters in each layer and switching among the layers.

For optical filtering, a selectable wavelength filter can be implemented for applications such as rear projection televisions and computer monitors. This has applications in compact disk and optical storage media, including volume holography. Optical designers have recognized the benefits of using holographic lenses in microdisplay applications because of their small size and lightweight. Holographic elements, however, only diffract a narrow bandwidth of light, typically 20 to 30 nm wide, thus limiting them to a single color, typically green. This is often seen in head-mounted displays for the military and in high-end industrial and medical applications. The ADSL technology is capable of switching the lens from clear to a red, blue or green holographic lens in stacked layers quickly enough to visually blend a flicker-free miniature display. The result is a full-color holographic display suitable for wearable computer displays and portable internet devices in general. This technology is used at the heart of several new devices that can "electrically switch" diffractive optical Bragg gratings on or off. This unique functionality opens up a broad range of components and subsystems used to control light, especially at the very high speeds required for optical telecommunications applications. This technology allows for recording of complex Bragg gratings which can encapsulate binary optical features, thereby reducing size, improving efficiency and lowering cost.

For wireless devices, an integrated sequential holographic lens is possible for enabling visual displays on compact devices such as cell phones. This has potential applications to handheld internet devices, CMOS device imaging, and wearable display technology. The long-term viability of portable and handheld devices, including smart phones, is dependent upon their providing an easy to use tool with which people can access information. Microdisplays (tiny high resolution displays on a chip) are part of the solution for these applications; ASIL can holographically encapsulate the prescriptions of multiple lenses within a slim glass (laminated) solid state device, saving space and decreasing weight, complexity and cost. The optical characteristics are calculated, computer-generated, and holographically recorded so that when the ASIL is embedded within a display, any single layer of the multi-layer ASIL may be switched clear momentarily, allowing the next "stacked" layer's optical properties to become activated. For instance, by switching a layer clear and synchronizing it with each of the microdisplay RGB sequential display cycles, the ASIL is able to solve the complex magnification problems associated with converting a microdisplay into a high visibility display.

The explanations herein discuss both wavelength and frequency, which have a reciprocal relationship ($\lambda=c/f$, where c=speed of light), as is well known in the field of optics.

Wavelength Division Multiplexing (WDM) and Dense Wavelength Division Multiplexing (DWDM) are light-wave application technologies that enable multiple wavelengths (colors of light) to be paralleled into the same optical fiber with each wavelength potentially assigned its own data diagnostics. Currently, WDM and DWDM products combine many different data links over a single pair of optical fibers by re-modulating the data onto a set of lasers, which are tuned to a very specific wavelength (within 0.8 nm tolerance, following industry standards). On current products, up to 32 wavelengths of light can be combined over a single fiber link with more wavelengths contemplated for future applications. The wavelengths are combined by passing light through a series of thin film interference filters, which consist of multi-layer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

Ideally, a WDM laser would produce a very narrow linewidth spectrum consisting of only a single wavelength, and an ideal filter would have a square bandpass characteristic of about 0.4 nm width, for example, in the frequency domain. In practice, however, every laser has a finite spectral width, which is a Gaussian spread about 1 to 3 nm wide, for example, and all real filters have a Gaussian bandpass function. It is therefore desirable to align the laser center wavelength with the center of the filter passband to facilitate the reduction of crosstalk between wavelengths, since the spacing between WDM wavelengths are so narrow. In commercial systems used today, however, it is very difficult to perform this alignment—lasers and filters are made by different companies, and it is both difficult and expensive to craft precision tuned optical components. As a result, the systems in use today are far from optimal; optical losses in a WDM filter can be as high as 4 db due to misalignment with the laser center wavelength (the laser's optical power is lost if it cannot pass through the filter). This has a serious impact on optical link budgets and supported distances, especially since many filters must be cascaded together in series (up to 8 filters in current designs, possibly more in the future). If every filter was operating at its worst case condition (worst loss), it would not be possible to build a practical system. Furthermore, the laser center wavelength drifts with voltage, temperature, and aging over their lifetime, and the filter characteristics may also change with temperature and age. The laser center wavelength and filter bandwidth may also be polarization dependent. This problem places a fundamental limit on the design of future WDM networking systems.

A second, related problem results from the fact that direct current modulation of data onto a semiconductor laser diode causes two effects, which may induce rapid shifts in the center wavelength of the laser immediately after the onset of the laser pulse. These are (1) frequency chirp and (2) relaxation oscillations. Both effects are more pronounced at higher laser output powers and drive voltages, or at higher modulation bit rates. Not only can these effects cause laser center wavelengths to change rapidly and unpredictably, they also cause a broadening of the laser linewidth, which can be a source of loss when interacting with optical filters or may cause optical crosstalk. Avoiding these two effects requires either non-standard, expensive lasers, external modulators (which are lossy and add cost), or driving the laser at less than its maximum power capacity (which reduces the link budget and distance). Lowering the data modulation rate may also help, but is often not an option in multi-gigabit laser links.

It would thus be highly desirable to provide a stable, optimal alignment between a laser center wavelength and the center of a Gaussian bandpass filter in order to optimize power transmission through such fiber optic systems and reduce optical crosstalk interference in optical networks.

SUMMARY OF THE INVENTION

Accordingly, it is a primary object of the present invention to provide electrically switchable optical elements using wavelength locked feedback loops.

A further object of the subject invention is the provision of a combination of ESBG technology with a wavelength locked loop to provide variable focal length optical systems which automatically adjust for the focal length of incident light.

The present invention concerns wavelength selective devices which encompass wavelength selective devices of all types including filters of all types including comb filters, etalon filters and rotatable disc filters and wavelength selective gratings of all types including Bragg gratings and array waveguide gratings.

It is an object of the present invention to provide a servo-control "wavelength-locked loop" circuit that enables real time mutual alignment of an electromagnetic signal having a peaked spectrum function including a center wavelength and a wavelength selective device implementing a peaked passband function including a center wavelength, in a system employing electromagnetic waves.

It is another object of the present invention to provide a servo-control system and methodology for WDM and DWDM systems and applications that is designed to optimize power through multi-gigabit laser/optic systems.

It is a further object of the present invention to provide a wavelength-locked loop for an optical system that enables real time alignment and tracking of any spectral device that selects a wavelength, such as a Bragg grating, in optical fibers and waveguides, etc., for use in WDM systems.

It is yet another object of the present invention to provide a servo/feedback loop for an optical system, referred to as a "wavelength-locked loop," that enables real time alignment of a laser with variable optical attenuators by offsetting an optical filter from a known transmission in optical fibers and waveguides, etc.

It is yet a further object of the present invention to provide a servo/feedback loop for an optical system, referred to as a "wavelength-locked loop," that may be used in light polarization applications.

It is still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that the optical loss of a WDM filter/laser combination is greatly reduced, thereby enabling significantly larger link budgets and longer supported distances.

It is yet still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that lower cost lasers and filters may be used providing a significant cost reduction in the WDM equipment.

When employed in laser/optical networks, the system and method of the present invention may be used to tune laser diode devices, and/or compensate for any type of wavelength-selective element in the network, including wavelength selective filters, attenuators, and switches, in fiber Bragg gratings, ring resonators in optical amplifiers, external modulators such as acousto-optic tunable filters, or array waveguide gratings. This applies to many other optical components in the network as well (for example, optical amplifiers that may act as filters when operating in the nonlinear regime). Furthermore, the system and method of the invention may be used to implement less expensive devices for all of the above application areas.

Alternately, the system and method of the invention may be implemented to tune such devices for WDM and optical network applications, in real-time, during manufacture, e.g., tuning all lasers to a specific wavelength. This would significantly increase lot yields of laser devices which otherwise may be discarded as not meeting wavelength specifications as a result of manufacture process variations, for example.

The wavelength locked loop of the present invention enables a tighter control of wavelength, which allows an increased density of wavelength channels with less cross talk between channels in a wavelength multiplex system, which might typically include 32 or 64 channels or links. Pursuant to the present invention, each channel includes a separate wavelength locked loop which includes a separate source such as a laser and wavelength selective device such as a filter. Accordingly a wavelength multiplex system can include an array of 32 or 64 lasers and an array of 32 or 64 filters.

BRIEF DESCRIPTION OF THE DRAWINGS

The foregoing objects and advantages of the present invention for electrically switchable optical elements using wavelength locked feedback loops may be more readily understood by one skilled in the art with reference being had to the following detailed description of several embodiments thereof, taken in conjunction with the accompanying drawings wherein like elements are designated by identical reference numerals throughout the several views, and in which:

FIGS. 2(a)–2(c) are signal waveform diagrams depicting the relationship between laser optical power as a function of wavelength for three instances of optic laser signals;

FIGS. 3(a)–3(c) are signal waveform diagrams depicting the laser diode drive voltage dither modulation (a sinusoid) for each of the three waveform diagrams of FIGS. 2(a)–2(c);

FIGS. 4(a)–4(c) are signal waveform diagrams depicting the resulting feedback error signal output of the PIN diode for each of the three waveform diagrams of FIGS. 2(a)–2(c);

FIGS. 5(a)–5(c) are signal waveform diagrams depicting the cross product signal resulting from the mixing of the amplified feedback error with the original dither sinusoid;

FIGS. 6(a)–6(c) are signal waveform diagrams depicting the rectified output laser bias voltage signals which are fed back to adjust the laser current and center frequency;

DETAILED DESCRIPTION OF THE INVENTION

The present invention provides a novel servo-control system implemented for optical systems including light sources, such as lasers, and frequency selective devices, such as bandpass filters. The servo-control system, herein referred to as the "wavelength-locked loop" or "lambda-locked loop" (since the symbol lambda is commonly used to denote wavelength), implements a dither modulation to continuously adjust an electromagnetic signal source characterized as having a peaked frequency spectrum or peaked center wavelength, e.g., laser light, so as to track the center of a frequency selective device, e.g. a filter passband. In this manner, optimal power of the signal is transmitted and optimal use is made of the system transmission bandwidth.

Figure 1A:
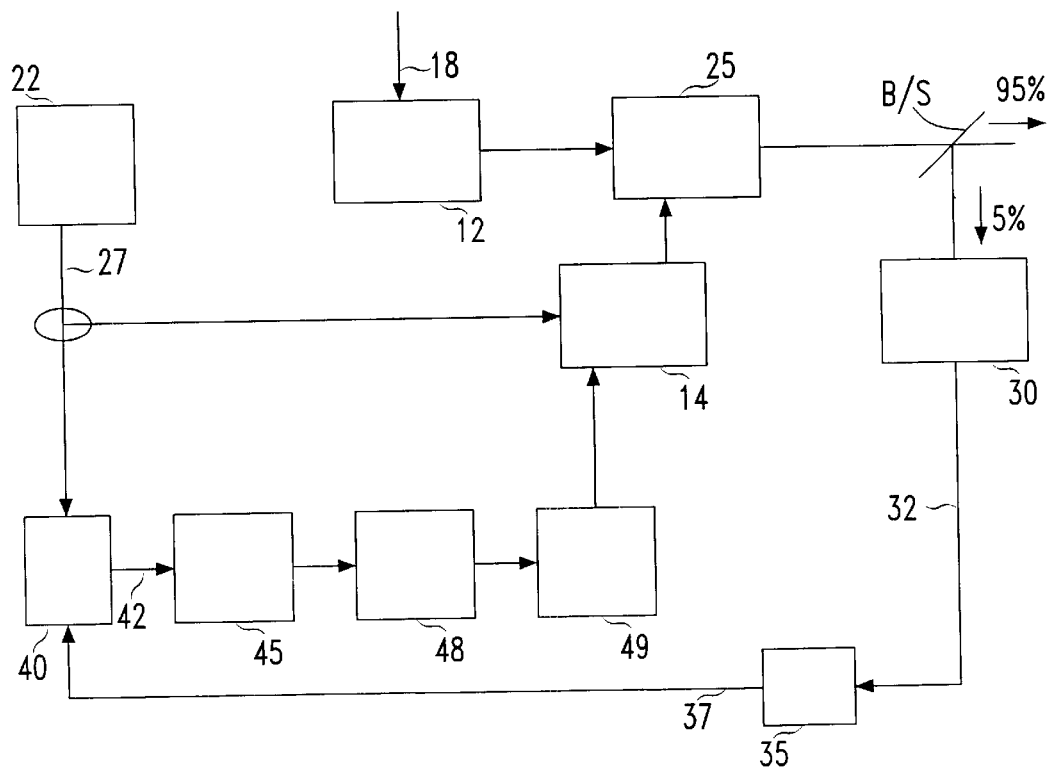
FIG. 1(a) illustrates a first embodiment of the present invention wherein a commercially available ASIL is controlled by a ditter-modulated driver circuit that switches the focal length of the ASIL.

FIG. 1(a) illustrates a first embodiment of the present invention wherein a commercially available ASIL 25 is controlled by a dither-modulated driver circuit 14 that switches the focal length of the ASIL, and the driver 14 is modulated by a dither signal 27 generated by a commercially available, electrical sinusoidal dither oscillator 22. The oscillator 22 frequency can be quite low, compatible with a current 85 Hz limitation on ASIL switching; this causes the focal length of the ASIL to oscillate about a nominal value, which is set by a separate digital control logic circuit 49. An optical source 12, such as a laser or light emitting diode which can function at almost any wavelength, illuminates the ASIL and is focused to a spot size determined by the nominal position of the ASIL focal length. Although the focal spot will tend to blur slightly due to the dithering of the ASIL focal length, this dither amplitude is small enough to be negligible and the dither modulation rate for the ASIL can be chosen to be fast or slow enough so as not to interfere with detection or observation of the spot size.

The output light from the ASIL is sampled by a beam splitter B/S, which reflects a small fraction of the light to a photodetector 30. The electrical output of this detector dithers at the same frequency as the input light, which is effectively modulated by the ASIL. This signal is fed back, amplified at 35, and mixed at 40 with the original dither modulation signal from the same dither oscillator source 22. The multiplier or mixer 40 generates the cross product of the two signals which is low pass filtered at 45, and integrated and preferably digitized at 48 to obtain a signal whose amplitude is proportional to the focused optical power from the ASIL. This signal is used in the control logic 49 to control the nominal position of the ASIL lens, adjusting it so that the ASIL lens is maintained in focus and the focus is optimized.

An alternative embodiment can position an aperture and/or lens in front of the photodetector 30 to simulate viewing conditions for the optical signal that does not pass through the feedback loop. For example, in a multi-layer compact disk storage system, this apparatus can be used to dynamically adjust the ASIL focus to different planes in the compact disk.

Another embodiment can replace the single light source 12 and single detector 30 with a multi-element light source and a multi-element detector array; feedback from each pixel in the detector array can be independently optimized by a more complex version of the control logic. For example, this embodiment could be used to adjust the focus at only the edges of an image. This has applications in rear projection television or imaging systems, and in high definition television systems.

Another embodiment can use the wavelength locked loop to correct for mechanical shocks or vibrations which tend to move the image source with respect to the display. This is typical of mobile display applications including internet enabled call phones and wearable computer displays.

Figure 1B:
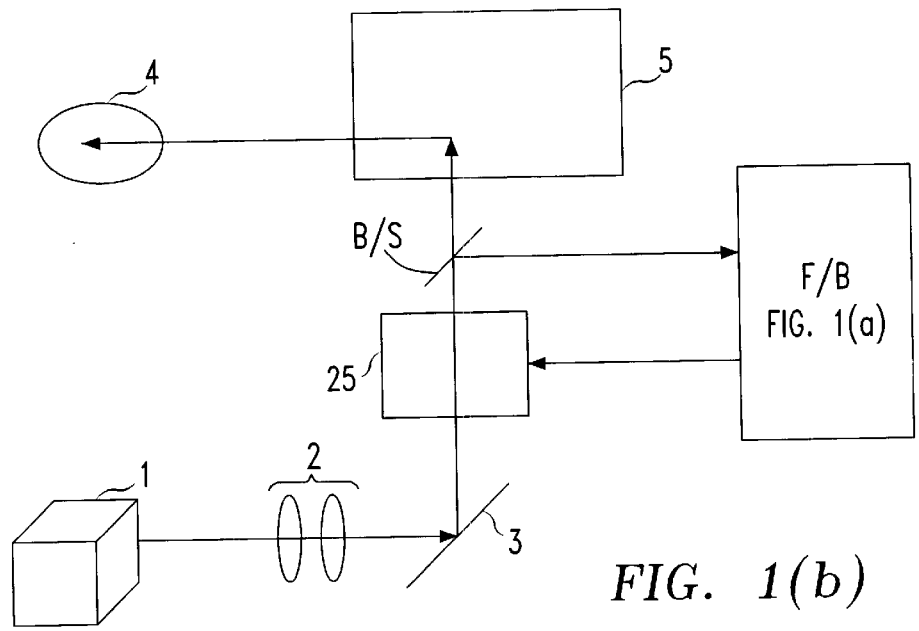
FIG. 1(b) illustrates an embodiment of an ASIL design for a microdisplay imaging system wherein the display is more robust to mechanical movements because the wavelength locked feedback loop keeps the ASIL focal length optimized as the optical alignment changes or as the distance from the display to the ASIL (or from the ASIL to the observer) changes slightly.

FIG. 1(b) illustrates an exemplary embodiment of an ASIL design for a microdisplay imaging system wherein a two dimensional image formed by a microdisplay and CMOS control system 1 is relayed by relay lenses 2 and a folding mirror 3 onto an ASIL 4 having an ASIL wavelength locked feedback loop, similar to that shown in FIG. 1a. The image formed by the ASIL 4 is directed onto the eye 5 of a viewer, as by an optional reflective holographic element 6. The display of FIG. 1(b) is more robust to mechanical movements because the wavelength locked feedback loop maintains the ASIL focal length optimized as the optical alignment changes or as the distance from the display to the ASIL (or from the ASIL to the observer) changes slightly.

Figure 1C:
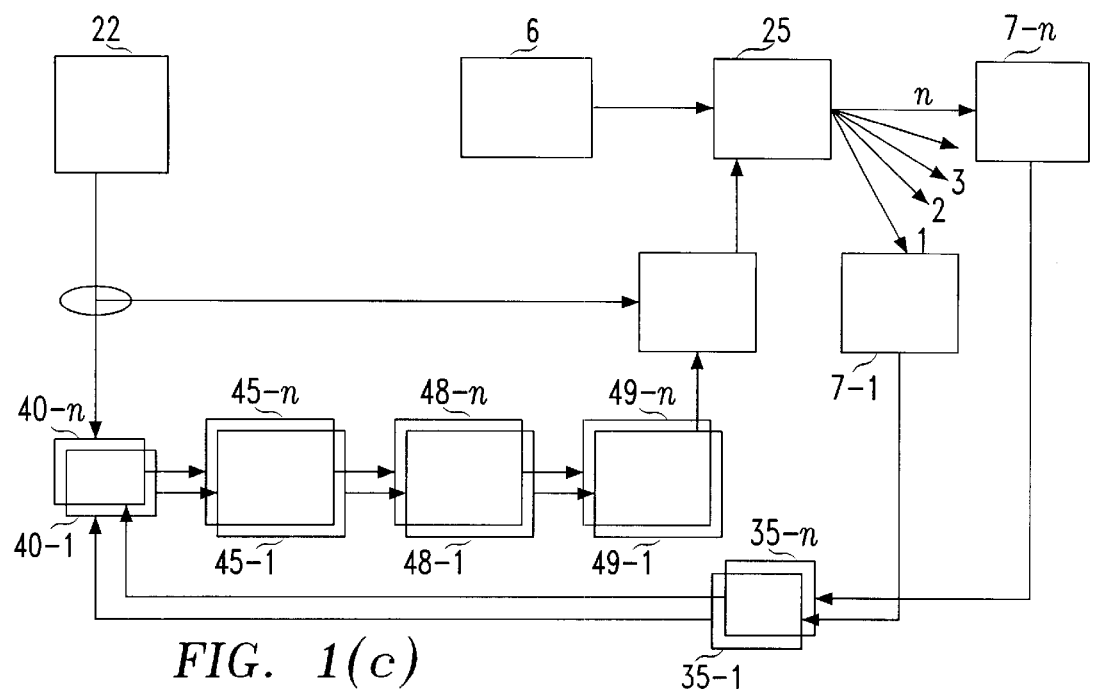
FIG. 1(c) illustrates an embodiment of an ASIL for a WDM equalizer/filter/optical switch which involves the use of a wavelength locked feedback loop in an optical communication wavelength division multiplexing switch, or wavelength division multiplexing filter, or wavelength division multiplexing equalizer.

FIG. 1(c) illustrates another embodiment of an ASIL used in a WDM optical communication system as a wavelength multiplexing equalizer or filter or optical switch, which involves the use of a dither-operated, wavelength locked feedback loop. In this embodiment, an optical input 6 from a WDM optical communication system consists of multiple (1, 2 . . . n) light wavelengths which are input to the ASIL device 25, and the ASIL 25 focuses or deflects the multiple wavelengths along multiple paths (1,2 . . . n) to multiple detectors (7-1, 7-2 . . . 7n) for multiple (1,2 . . . n) output ports. A small portion of the output from each output port is sampled, as by a detector similar to detector 30 in FIG. 1a (note that most of the optical signal may be forwarded along for subsequent use). Each detector 7 has its own dither-operated feedback loop to regulate the amount of light diverted along its channel; in this case, the control logic is more complex as it needs to adjust the ASIL to regulate how much optical power is diverted to each of the possible output ports. If the ASIL diverts all of the light to one output port at a time, it functions as an optical switch. If the ASIL diverts only certain wavelengths to certain output ports, it acts as an optical add/drop filter. Or, if it adjusts the amount of power diverted to one output port based upon the power diverted and received at another output port, it can function as an optical equalizer for the wavelength division multiplexing (WDM) system.

Figure 1D:
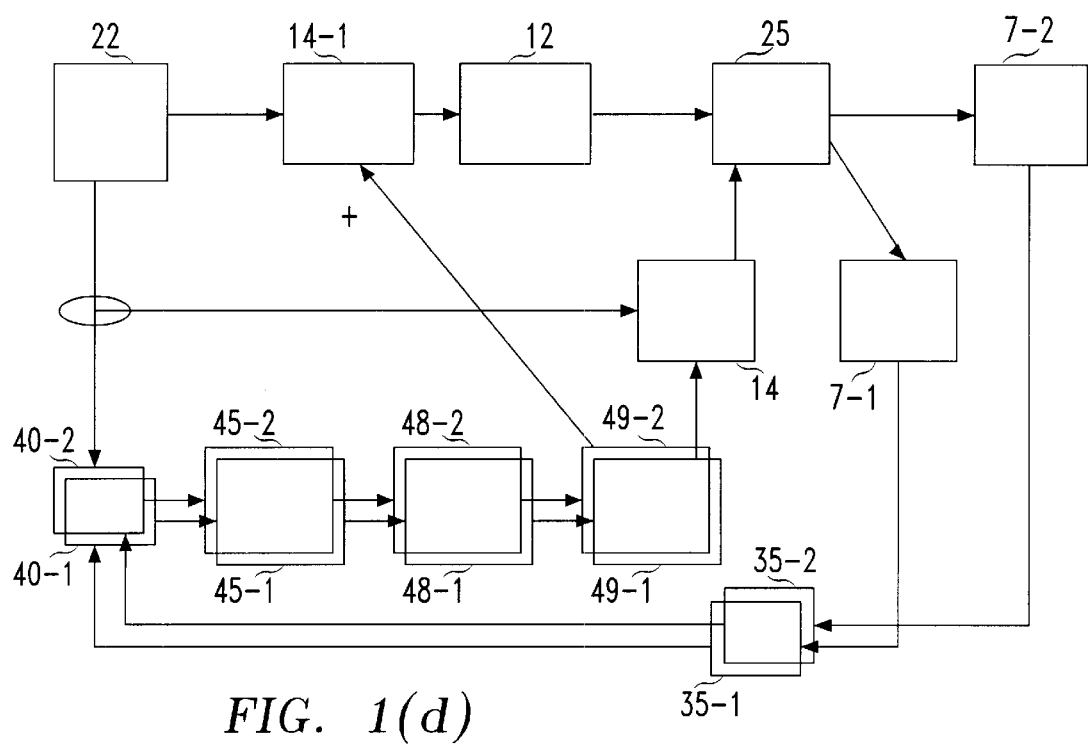
FIG. 1(d) illustrates another embodiment of an ASIL and laser wavelength control system which involves adjusting the wavelength of the light source and/or the ASIL separately with two feedback loops, providing independent control of the laser wavelength and also of the ASIL focal length.

FIG. 1(d) illustrates another embodiment of an ASIL and laser wavelength control system which involves controlling the wavelength of the laser source and controlling the ASIL separately with two feedback loops. This embodiment allows for the independent control of the laser wavelength and also of the ASIL focal length. Potential applications include optical add/drop multiplexers in which the add wavelength is tunable and can be diverted to different outputports (a combination of add/drop and switching, or add/drop and equalizing).

The feedback loop is stable for a wide range of conditions, and may be implemented as a variant on an externally excited adaptive loop design familiar from control systems theory. Note that the feedback loop acts as a high level state machine, compensating for all of the internal variables (wavelength selectivity) of the laser diode, ASIL, filter, and other components with a single mechanism.

The wavelength-locked loop (WLL) is now described in further detail with reference to FIGS. 1(e) and 2–9. The basic operating principle of the wavelength-locked loop (WL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

Figure 1E:
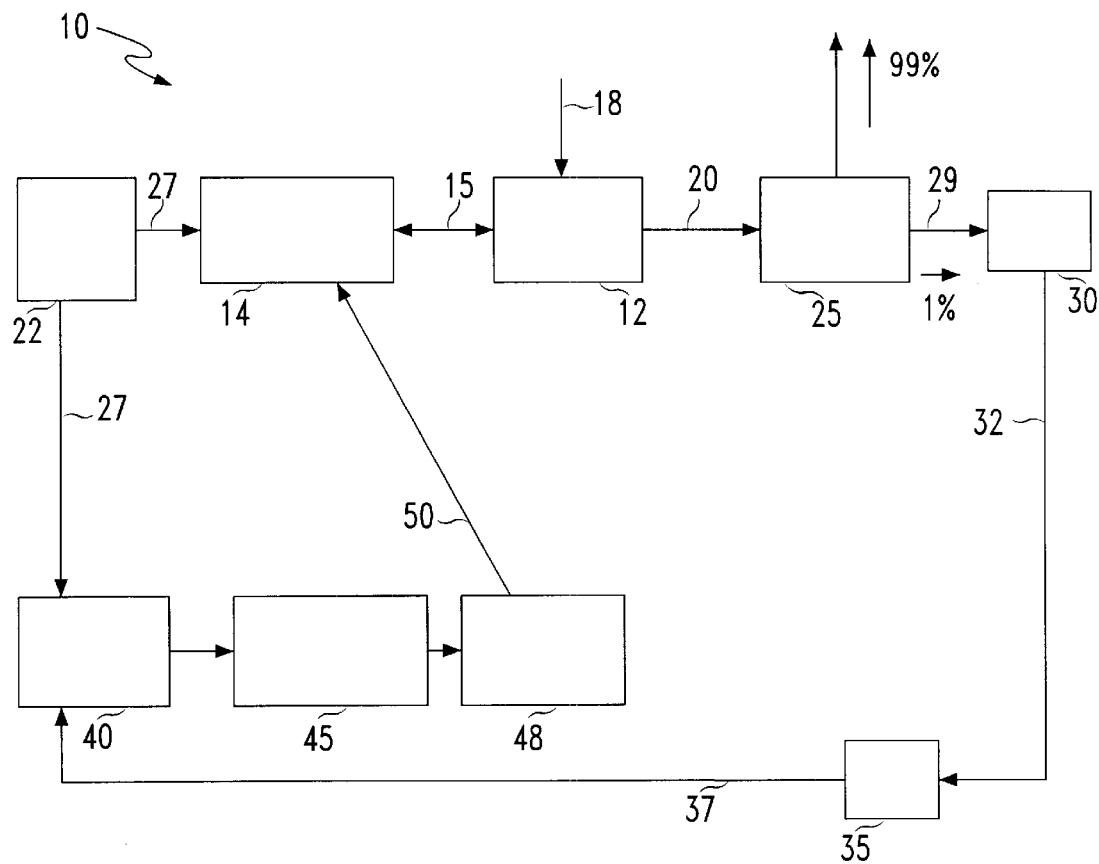
FIG. 1(e) illustrates a wavelength tunable laser diode defining a laser cavity, the output of which is incident on a variable position MEM which tunes the wavelength of the laser diode by using a dither wavelength locked feedback loop.

FIG. 1(e) depicts an exemplary optical system 10 including a light source such as laser diode 12 driven with both a bias voltage 15 from a wavelength control bias voltage circuit 14 and modulated data 18 from a data source (not shown). The laser diode generates an optical (laser light) signal 20 that is received by a bandpass filter 25, or any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass.

As further shown in FIG. 1(e), according to the invention, there is an added sinusoidal dither modulation circuit or oscillator 22 for generating a sinusoidal dither modulation that modulates the wavelength control 14 to vary the laser diode wavelength. The dither modulation frequency is on the order of a few kilohertz (kHz) but may range to the Megahertz range. Preferably, the dither modulation frequency is much less than the data rate which is typically on the order of 1–10 GHz. Modulation of the wavelength control in this manner causes a corresponding dither in the laser center wavelength. Modulated data is then imposed on the laser, and the optical output passes through the bandpass filter 25. Preferably, the filter 25 is designed (e.g. with a beam splitter B/S) to tap off a small amount of light, for example, which is incident upon a photo detector receiver device, e.g., PIN diode 30, and converted into an electrical feedback signal 32. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 25 to the optical network (not shown). As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 27. The cross product signal 42 that results from the multiplication of the amplified PIN diode output (feedback signal) 37 and the dither signal 27 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the MEM wavelength control 15. In this manner, the laser wavelength will increase or decrease until it exactly matches the center of the filter passband. Alternately, the error signal 50 may be first converted to a digital form prior to input to the wavelength control 14.

According to one aspect of the invention, the WLL will automatically maintain tracking of the laser center wavelength to the peak of the optical filter. However, in some cases, it may not be desirable to enable laser alignment to the filter peak, e.g., in an optical attenuator. Thus, as shown in the embodiment depicted in FIG. 8, there is provided an optional external tuning circuit, herein referred to as a wavelength shifter device 51, that receives the error signal and varies or offsets it so that the laser center wavelength may be shifted or offset in a predetermined manner according to a particular network application. That is, the wavelength shifter 51 allows some external input, e.g., a manual control element such as a knob, to introduce an arbitrary, fixed offset between the laser center wavelength and the filter peak.

Figure 7:
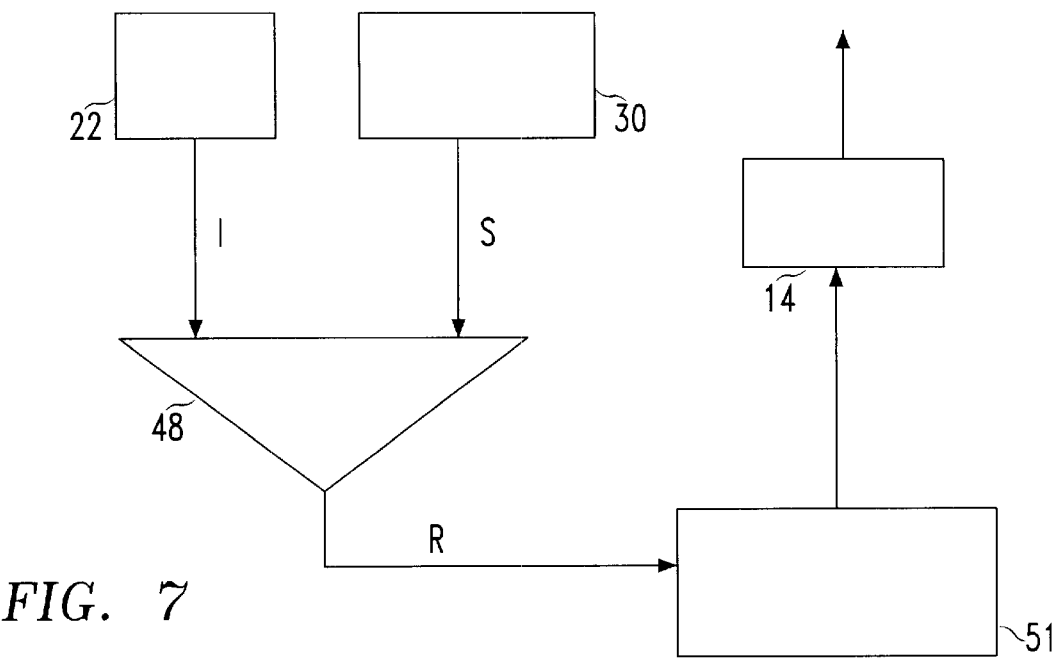
FIG. 7 is a generalized circuit diagram depicting how dithering is implemented in the WLL system of the present invention.

A generalized description of how dithering is implemented for providing a WLL in the present invention is now provided in view of FIG. 7. As shown in FIG. 7, the sinusoidal dither generator (harmonic oscillator) 22 produces a dither signal 27 which causes the laser center wavelength to oscillate with a small amplitude about its nominal position. After passing thru the optical bandpass filter, the laser wavelength variation is converted into intensity variation which is detected by the photodetector circuit 30 (e.g., photodiode). The servo loop feeds back the photodiode output signal, S, and takes a vector cross product with the original sinusoidal dither, I. The cross product result is averaged (integrated) over a time period T by 48 and may be sampled and digitized to produce the equivalent of an error detect signal, R, which is bipolar and proportional to the amount by which the laser center wavelength and filter center wavelength are misaligned. Optionally, the signals may be normalized to account for variations in the laser power output from the filter. Optionally, an external tuning circuit 51 may be implemented to receive the error signal and enable the laser center wavelength offset to vary to an arbitrary value. Finally, the error signal R is fed back used by the wavelength control 14 to adjust the laser center wavelength in the proper direction to better align with the filter center wavelength.

The operating principle is further illustrated in the timing and signal diagrams of FIGS. 2–6. FIGS. 2(a)–2(c) particularly depicts the relationship between laser optical power as a function of wavelength for three instances of optic laser signals: a first instance (FIG. 2(a)) where the laser signal frequency center point 21 is less than the bandpass function centerpoint as indicated by the filter bandpass function 60 having centerpoint 62 as shown superimposed in the figures; a second instance (FIG. 2(b)) where the laser frequency center point 21 is aligned with the bandpass function centerpoint 62; and a third instance (FIG. 2(c)) where the laser frequency center point 21 is greater than the bandpass function centerpoint 62. In each instance, as depicted in corresponding FIGS. 3(a)–3(c), the drive voltage signal 15 is shown dithered (a sinusoid) resulting in the laser wavelength dithering in the same manner. The dithered laser diode spectra passes through the filter, and is converted to electrical form by the PIN diode 30. In each instance of the laser signals depicted in FIGS. 2(a) and 2(c) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 4(a) and 4(c). It is noted that for the laser signals at frequencies below the peak (FIG. 2(a)) the feedback error signal 32 corresponds in frequency and phase to the dither signal (FIG. 4(a)), however for the laser signals at frequencies above the peak (FIG. 2(c)) the feedback error signal 32 corresponds in frequency but is 180° opposite phase of the dither signal (FIG. 4(c)). Due to the bipolar nature of the feedback signal (error signal) for cases when the laser signal centerpoint is misaligned with the bandpass filter centerpoint, it is thus known in what direction to drive the laser (magnitude and direction), which phenomena may be exploited in many different applications. For the laser signal depicted in FIG. 2(b) having the laser frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 4(b) showing a feedback error signal at twice the frequency of the dither frequency.

Thus, in each instance, as depicted in corresponding FIG. 4(b), the resulting feedback signal exhibits frequency doubling if the laser center wavelength is aligned with the filter center wavelength; otherwise it generates a signal with the same dither frequency, which is either in phase (FIG. 4(a)) or out of phase (FIG. 4(c)) with the original dither modulation. It should be understood that, for the case where the laser center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling at opposite phases depending upon whether the laser center frequency is inboard or outboard of the filter center frequency. Thus, even though partial frequency doubling is detected, it may still be detected from the feedback signal in which direction and magnitude the laser signal should be driven for alignment.

Thus, referring now to FIGS. 5(a) and 5(c), for the case when the laser and filter are not aligned, the cross product signal 42 resulting from the mixing of the amplified feedback error with the original dither sinusoid is a signed error signal either at a first polarity (for the laser signals at frequencies below the bandpass filter centerpoint), such as shown in FIG. 5(a) or, at a second polarity (for the laser signals at frequencies above the bandpass filter centerpoint), such as shown in FIG. 5(c). Each of these signals may be rectified and converted into a digital output laser bias voltage signal 48 as shown in respective FIGS. 6(a) and 6(c), which are fed back to respectively increase or decrease the laser current (wavelength) in such a way that the laser center wavelength moves closer to the bandpass filter centerpoint. For the case when the laser and filter are aligned. the cross product generated is the frequency doubled signal (twice the frequency of the dither) as shown in the figures. Consequently, this results in a 0 V dc bias voltage (FIG. 6(b)) which will maintain the laser frequency centerpoint at its current wavelength value.

In order to describe further benefits of the invention, it is first noted that although it may appear that if a filter bandpass is larger than the laser linewidth, then the entire optical pulse will pass through the filter unaffected. However, this is clearly not the case; the laser spectra and filter function are both Gaussian, in both time and wavelength (reciprocal of frequency). Thus, passing the laser spectra through the filter results in a convolution between the spectrum and filter functions. Implementing analog signal processing, an output optical spectrum is produced which is actually narrower than the input spectra (i.e., some of the light is lost during filtering). In a real WDM system there may be at least two (2) bandpass filter devices in a link to perform multiplex/demux functions at either end: in practice, there may be many bandpass filters configured in series. This leads to a secondary problem: when two filters are in series and their bandpass centers are not aligned, the original signal must be convolved with both filter functions; this narrows the signal spectra even further, at the cost of lowering the optical power by discarding the edges of the light spectra. A succession of filters not aligned with each other can be shown to have the same characteristics as a single, much narrower, filter. This further reduces the margin for misalignment between the laser and multiple filters. For example, even if the ideal center to center, wavelength spacing of a WDM system is 0.8 nm, due to misalignment between the mux and demux filters this window may be reduced to approximately 0.4 nm or less. This would require extreme precision and stability for the laser wavelength, making for a very expensive laser transmitter. Thus, there are really two problems to be solved: (1) laser to filter alignment; and, (2) filter to filter alignment. Note that when signals propagate through a fiber optic network and traverse multiple filters the wavelength may shift due to these effects combined with temperature and environmental effects. It is a real, practical problem to keep an input wavelength the same throughout the network, so that network architectures such as ring mesh, wavelength reuse, and wavelength conversion may work properly, i.e., this is called frequency referencing.

The present invention addresses frequency referencing as it can handle both of these instances. For example, as shown in FIG. 8, there is depicted a general block diagram depicting the underlying system architecture employing the wavelength-locked loop technique in an optical system 10' employing a series connection of two bandpass filters 25a, 25b.

Figure 9:
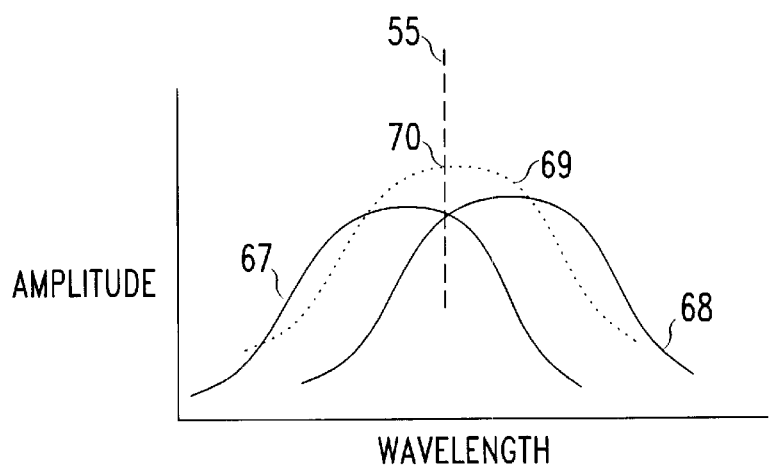
FIG. 9 is a signal waveform diagram depicting the relationship between laser optical power as a function of wavelength for the case of aligning a laser signal through a system including two bandpass filters in series, as depicted in FIG. 8.
Figure 8:
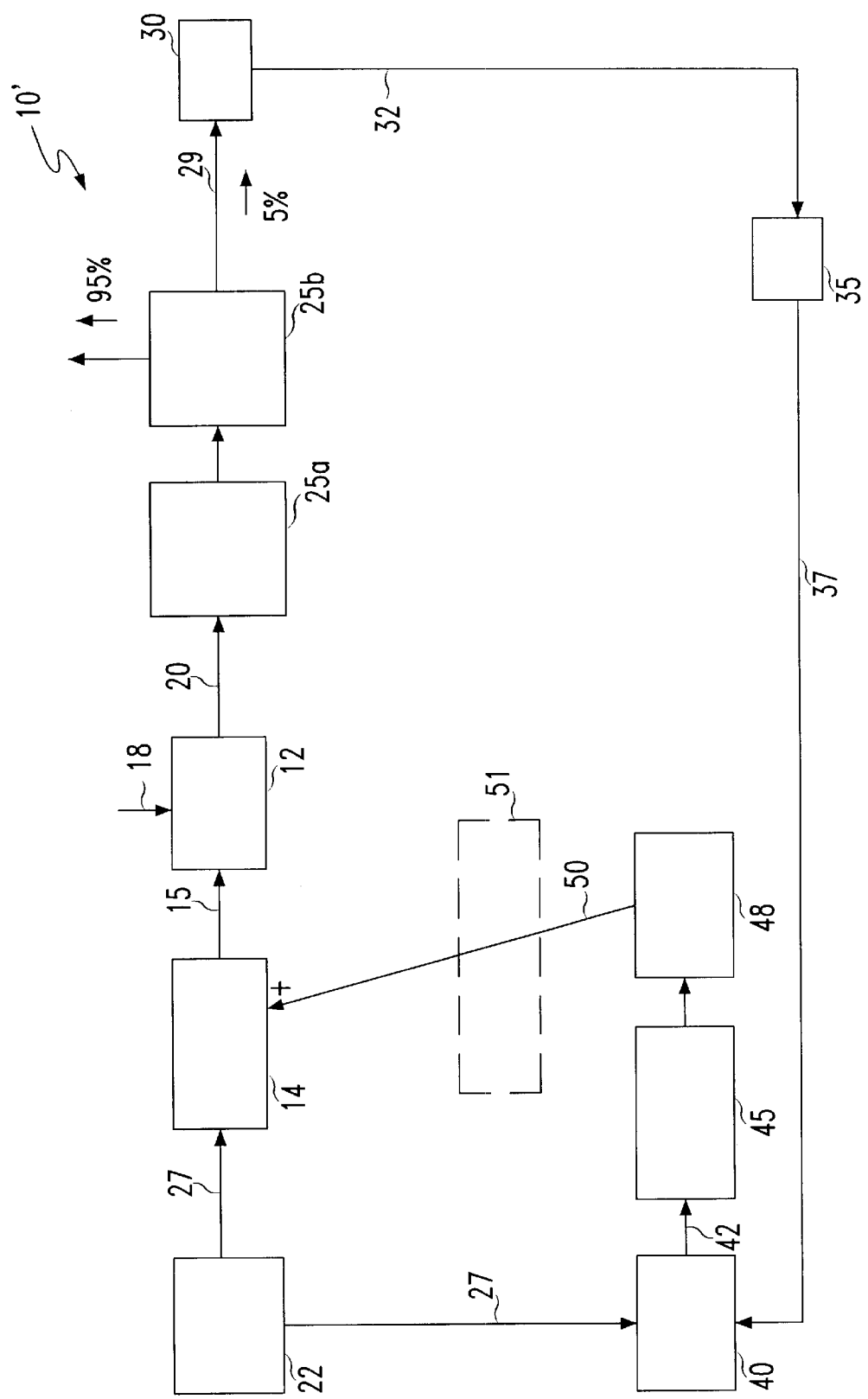
FIG. 8 is a general block diagram depicting the underlying system architecture for employing an optional wavelength shifter in the wavelength-locked loop technique, and also an optical system employing two bandpass filters according to the present invention.

FIG. 9 depicts each of the individual filter responses 67 and 68 for the two bandpass filters 25a, 25b of FIG. 8 and the corresponding composite filter response 69 having a centerpoint or peak 70. When performing filter to filter or multiple filter alignment, the technique of the invention depicted in FIG. 8 may be implemented to tune the laser signal 55 to have a center frequency such that maximum power transfer will occur through the series connection of two bandpass filters as represented by its composite filter response 69 (FIG. 9). Generally, a cascade of bandpass filters results in an effective narrowing of the overall passband, as the net filter response is a convolution of the component filter responses. The WLL can align the laser center wavelength with the middle of this composite passband.

The system and method of the present invention may be used to tune a laser wavelength to compensate for any type of wavelength-selective element in a network, including wavelength selective switches, tunable filters, in fiber Bragg gratings, ring resonators in optical amplifiers, external modulators such as acousto-optic tunable filters, or array waveguide gratings. This applies to many other optical components in the network as well (for example, optical amplifiers that can act as filters when operating in the nonlinear regime). This method may additionally be used to implement less expensive devices for all of the above application areas. As the optical loss of a WDM filter/laser combination is greatly reduced by implementing the technique of the invention, significantly larger link budgets and longer distances may be supported. Further, the invention permits much lower cost lasers and filters to be used; since these are the most expensive parts of a WDM device today, there is a significant cost reduction in the WDM equipment.

While several embodiments and variations of the present invention for electrically switchable optical elements using wavelength locked feedback loops are described in detail herein, it should be apparent that the disclosure and teachings of the present invention will suggest many alternative designs to those skilled in the art.

Having thus described our invention, what we claim as new and desire to secure by Letters Patent is:

1. An electrically switchable optical element using a dither-operated feedback loop, comprising:

an electrically switchable optical element controlled by a dither-modulated driver that switches the focal length or deflection of the electrically switchable optical element, wherein the driver is modulated by a dither signal which causes the focal length or deflection of the electrically switchable optical element to oscillate about a nominal value;

an optical source for illuminating the electrically switchable optical element with light which is focused or deflected to an output as determined by the nominal position of the electrically switchable optical element;

a photodetector samples the output of the electrically switchable optical element to produce an electrical output signal which is dithered by the dither signal;

a dither-operated feedback loop, responsive to the electrical output signal of the photodetector, for generating a feedback control signal to control the drive for the electrically switchable optical element to control the nominal position of the electrically switchable optical element so that the focus or deflection is optimized.

2. The electrically switchable optical element of claim 1, wherein the feedback loop includes a multiplier for mixing the photodetector output with the dither signal to obtain a cross product signal whose amplitude is proportional to the focused or deflected optical power from the electrically switchable optical element.

3. The electrically switchable optical element of claim 1, wherein the feedback loop includes an amplifier for amplifying the detector electrical output signal, a multiplier for multiplying the photodetector electrical output signal with the dither signal to produce a cross product signal of the two signals, a low pass filter for filtering the cross product signal, and an integrator for integrating low pass filtered signals to obtain the feedback control signal.

4. The electrically switchable optical element of claim 1, wherein the optical source comprises a multi-element light source, and the photodetector comprises a multi-element detector array, and feedback from each element in the detector array independently controls a focus or deflection point.

5. The electrically switchable optical element of claim 1, in a wavelength division multiplexing system wherein the electrically switchable optical element selectively switches different frequencies by providing different wavelength filters in different layers and switches among the layers.

6. The electrically switchable optical element of claim 1, in a laser wavelength control system wherein the wavelength of the laser and the focal length of the electrically switchable optical element are adjusted independently with two different feedback loops, providing independent control of the laser wavelength and also of the focal length of the electrically switchable optical element.

7. The electrically switchable optical element of claim 1, wherein an optical input consists of multiple wavelengths input to the electrically switchable optical element, and the electrically switchable optical element focuses or deflects the multiple wavelengths to multiple detectors for multiple output ports, and each output port is sampled by a separate detector, and each separate detector has its own separate feedback loop to regulate the amount of light diverted to its output port, and the electrically switchable optical element is controlled to regulate how much optical power is diverted to each output port.

8. The electrically switchable optical element of claim 7, wherein the electrically switchable optical element diverts all of the light to one output port at a time, and functions as an optical switch.

9. The electrically switchable optical element of claim 7, wherein the electrically switchable optical element diverts preselected wavelengths to preselected output ports and functions as an add/drop filter.

10. The electrically switchable optical element of claim 7, wherein the electrically switchable optical element functions as an optical equalizer for wavelength division multiplexing and adjusts the amount of power diverted to one output port based on changes made to the power diverted to and received at another output port.

11. A method of operating an electrically switchable optical element using a dither-operated feedback loop, comprising:

controlling an electrically switchable optical element by a dither-modulated driver that switches the focal length or deflection of the electrically switchable optical element, by modulating the driver with a dither signal which causes the focal length or deflection of the electrically switchable optical element to oscillate about a nominal value;

illuminating the electrically switchable optical element with light which is focused or deflected to an output as determined by the nominal position of the electrically switchable optical element;

sampling the output of the electrically switchable optical element to produce an electrical output signal which is dithered by the dither signal;

generating a feedback control signal in a dither-operated feedback loop to control the drive for the electrically switchable optical element to control the nominal position of the electrically switchable optical element so that the focus or deflection is optimized.

12. The method of claim 11, including mixing the electrical output signal with the dither signal to obtain a cross product signal whose amplitude is proportional to the focused or deflected optical power from the electrically switchable optical element.

13. The method of claim 11, including amplifying the electrical output signal, multiplying the amplified electrical output signal with the dither signal to produce a cross product signal of the two signals, filtering the cross product signal, and integrating low pass filtered signals to obtain the feedback control signal.

14. The method of claim 11, including utilizing a multi-element light source, and a multi-element detector array, and feedback from each element in the detector array independently controls a focus or deflection change.

15. The method of claim 11, in a wavelength division multiplexing method wherein the electrically switchable optical element selectively switches different frequencies by providing different wavelength filters in different layers and switching among the layers.

16. The method of claim 11, including separately adjusting the wavelength of the laser and the focal length of the electrically switchable optical element with two feedback loops, providing independent control of the laser wavelength and also of the focal length of the electrically switchable optical element.

17. The method of claim 11, including directing multiple wavelengths as an input to the electrically switchable optical element, and the electrically switchable optical element focuses or deflects the multiple wavelengths beam to multiple detectors for multiple output ports, sampling each output port with a separate detector, providing each separate detector with its own separate feedback loop to regulate the amount of light diverted to its output port, and controlling the electrically switchable optical element to regulate how much optical power is diverted to each output port.

18. The method of claim 17, wherein the electrically switchable optical element diverts all of the light to one output port at a time, and functions as an optical switch.

19. The method of claim 17, wherein the electrically switchable optical element diverts preselected wavelengths to preselected output ports and functions as an add/drop filter.

20. The method of claim 17, wherein the electrically switchable optical element functions as an optical equalizer for wavelength division multiplexing, and adjusts the amount of power diverted to one output port based on changes made to the power diverted to and received at another output port.

* * * * *